United States Patent
Nathan et al.

(10) Patent No.: US 6,647,492 B1
(45) Date of Patent: Nov. 11, 2003

(54) METHOD OF PROVIDING PERSISTENT MEMORY TO A HAND-HELD PLATFORM OPERATING SYSTEM ON A COMPUTER SYSTEM

(75) Inventors: Robert H. Nathan, Atlanta, GA (US); Alan F. Hartman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 586 days.

(21) Appl. No.: 09/628,680

(22) Filed: Jul. 28, 2000

(51) Int. Cl.[7] .................. G06F 15/177; G06F 9/445
(52) U.S. Cl. .................. 713/1; 713/2; 717/174
(58) Field of Search .................. 713/1, 2, 100; 717/168, 174

(56) References Cited

U.S. PATENT DOCUMENTS

| | | | |
|---|---|---|---|
| 6,138,271 A | * | 10/2000 | Keeley .................. 717/140 |
| 6,351,850 B1 | * | 2/2002 | van Gilluwe et al. ....... 717/175 |
| 6,367,074 B1 | * | 4/2002 | Bates et al. .................. 711/170 |
| 6,484,309 B2 | * | 11/2002 | Nowlin et al. ............. 717/100 |

FOREIGN PATENT DOCUMENTS

JP          04191927 A   *  7/1992   ............. G06F/9/06

OTHER PUBLICATIONS

Jeff McLeman, Running Windows CE on standard PC, Aug. 24, 1998, Newsgroups: comp.os.ms–windows.ce, p. 1.*
r_z_aret@pen_fact.com, Installing Windows CE on a Desktop PC, Newsgroups: comp.os.ms–windows.ce, p. 1.*
Miguel Inacio, Can Windows CE V.2.0 work on a normal PC, Sep. 29, 1999, Newsgroups: comp.os.ms–windows.ce.*

* cited by examiner

*Primary Examiner*—Thomas M. Heckler
*Assistant Examiner*—Suresh K Suryawanshi
(74) *Attorney, Agent, or Firm*—Lowe Hauptman Gilman & Berner, LLP

(57) ABSTRACT

A method and apparatus for achieving the appearance of persistent memory in a system environment requiring persistent memory using a device having non-persistent memory. More particularly, the device having non-persistent memory has volatile memory and a storage device.

17 Claims, 3 Drawing Sheets

METHOD OF PROVIDING PERSISTENT MEMORY TO A HAND-HELD PLATFORM OPERATING SYSTEM ON A COMPUTER SYSTEM

FIELD OF INVENTION

The present invention relates generally to a method and apparatus for simulating memory persistence in a computer system, and more particularly, to such a method and apparatus wherein the memory persistence appears to a hand-held platform operating system and applications executing on a computer system, such as a personal computer system which is not a hand-held platform, as though the operating system and applications were executing on a hand-held platform.

BACKGROUND ART

Embedded operating systems, for example the Windows CE operating system produced by the Microsoft Corporation, are designed for implementation and use in hand-held or palm-top computers and typically require persistent memory. The terms "hand-held" or "palm-top" are used in a descriptive manner herein and are not intended to be restrictive. Persistent memory, i.e., nonvolatile memory, is memory in which the memory contents are not lost when main or external power is removed and is normally implemented with special low-power random access memory (RAM) devices combined with batteries for maintaining the RAM contents for protracted time periods whether or not external power is available. Executable or application software and operating system software, once installed on the hand-held platform are retained in either read only memory (ROM) or persistent memory and are not reinstalled after each powering off of the hand-held platform. In fact, such hand-held platforms or devices do not have a power off mode, i.e., the devices are not turned off or shutdown, instead the devices have a very-low power mode in which the device appears to be in a powered off state.

It is advantageous to be able to use a hand-held platform operating system and additional software on a computer system which is not a hand-held platform because the range of functionality offered to users is broadened. A standard hardware platform, e.g., non-hand-held platform computer system, is able to be used in configurations requiring only a hand-held platform, a stand-alone computer system, a networked workstation computer system, and a server computer system. Using a standard hardware platform for each of these configurations would reduce the overall cost of hardware and/or system purchases and increase the flexibility of hardware platform computer system configurations. For instance, the same standard hardware platform could be used at a tool rental check-out area or employment application kiosks requiring only hand-held platform functionality, at a checkout station requiring networked computer system functionality, or at an inventory and sales database location requiring server computer system functionality. The only required changes would be the operating system and application software.

For the range of computer systems encompassing the server through the networked workstation to the stand-alone computer system, the essential differences are in terms of processing speed and amount of memory. Typical servers require large amounts of memory, both random access memory and storage space or hard drive space, while networked workstations and stand-alone computer systems require less memory. Processing speed requirements vary based on the use of the computer system. Thus, a change of software (operating system and/or applications) on the computer system can change the functionality of the computer system from a stand-alone computer system to a networked workstation or to a server system.

The hand-held platform has an additional difference separating it from the aforementioned range of computer systems. As described above, the hand-held platform uses persistent memory for storage of software and information. Being able to remove or ameliorate this difference, allows for a broader range of use for the standard hardware platform. Thus, the standard hardware platform can be used for the entire range from hand-held platform to stand-alone computer system to networked workstation to server computer system solely by changing the installed and executing software. Further, using standard hardware platforms increases the ability and ease of obtaining, maintaining, and storing replacement hardware components. Therefore, there is a need in the art to provide a method and apparatus for simulating memory persistence in a computer system.

Use of hand-held platform software executing on existing computer systems such as either PC platforms, e.g. Intel-based personal computers or on existing terminals, e.g., requires an adaptation, either hardware or software-based, allowing the computer system to appear to have persistent memory for use by the hand-held platform operating system and/or application software. Therefore, there is a need in the art to provide a mechanism for a computer system to simulate persistent memory to hand-held platform software on the computer system.

A "hand-held platform" computer system as used herein is meant to indicate hand-held platform operating system and applications software installed and executing on computer system which is not a hand-held platform with persistent memory.

In order to further minimize the cost of configuring a particular computer system to act as a "hand-held platform" computer system it is desirable to eliminate the need for an additional operating system installation on the computer system, e.g., not requiring installation of Windows NT or Windows 2000 to support the hand-held platform software. However, accesses, i.e., reads and writes, of the computer system storage device and main memory need to be supported in order to provide persistent memory functionality to the hand-held platform software. In particular, hand-held platform software and information needs to be transferred from main memory of the computer system to the computer system's storage device in order to support simulation of persistent memory. Therefore, there is a need in the art to directly read and write from a computer system's storage device and main memory in place of using an operating system. To support simulating persistent memory to the "hand-held platform" computer system, it is necessary to convert a binary memory image on a computer system's storage device or main memory into a load file format loadable by the hand-held platform operating on the computer system.

SUMMARY OF THE INVENTION

Accordingly, an object of the present invention is to enable a computer system to simulate persistent memory to hand-held platform software on a computer system.

The present invention relates generally to a method and apparatus for simulating memory persistence in computer systems, and more particularly, to such a method and apparatus wherein the memory persistence appears to hand-held platform software on a computer system as though the software were on a hand-held platform.

In a method aspect of the present invention, a computer system having volatile memory, and a storage device with a load format image file is described. The load format image file includes hand-held platform software and information. The load format image file is loaded from the storage device into the volatile memory. The contents of the volatile memory is copied onto a memory image disk file and the memory image disk file is converted into a load format image file. The load format image file is then stored on a storage device.

A computer implemented system aspect of the present invention includes a processor, a volatile memory, and a storage device having sequences of instruction stored therein. The sequences of instructions, when executed by the processor, cause the processor to load a load format image file from the storage device into volatile memory. The contents of volatile memory is then copied onto a memory image disk file and the memory image disk file is converted into a load format image file. The load format image file is stored on the storage device.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

The present invention is illustrated by way of example, and not by limitation, in the figures of the accompanying drawings, wherein elements having the same reference numeral designations represent like elements throughout and wherein.

DETAILED DESCRIPTION OF THE DRAWING

A method and apparatus for simulating memory persistence in a computer system are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention consists of a program loader containing two components and a file conversion utility. The program loader components are 1) an image file loader including software for loading a load-format hand-held platform image file into the memory of a computer system and 2) a memory image copier including software for copying the contents of a computer system's memory onto a memory image disk file. The file conversion utility includes software for converting the memory image disk file into a hand-held platform load-format file.

Figure 1:
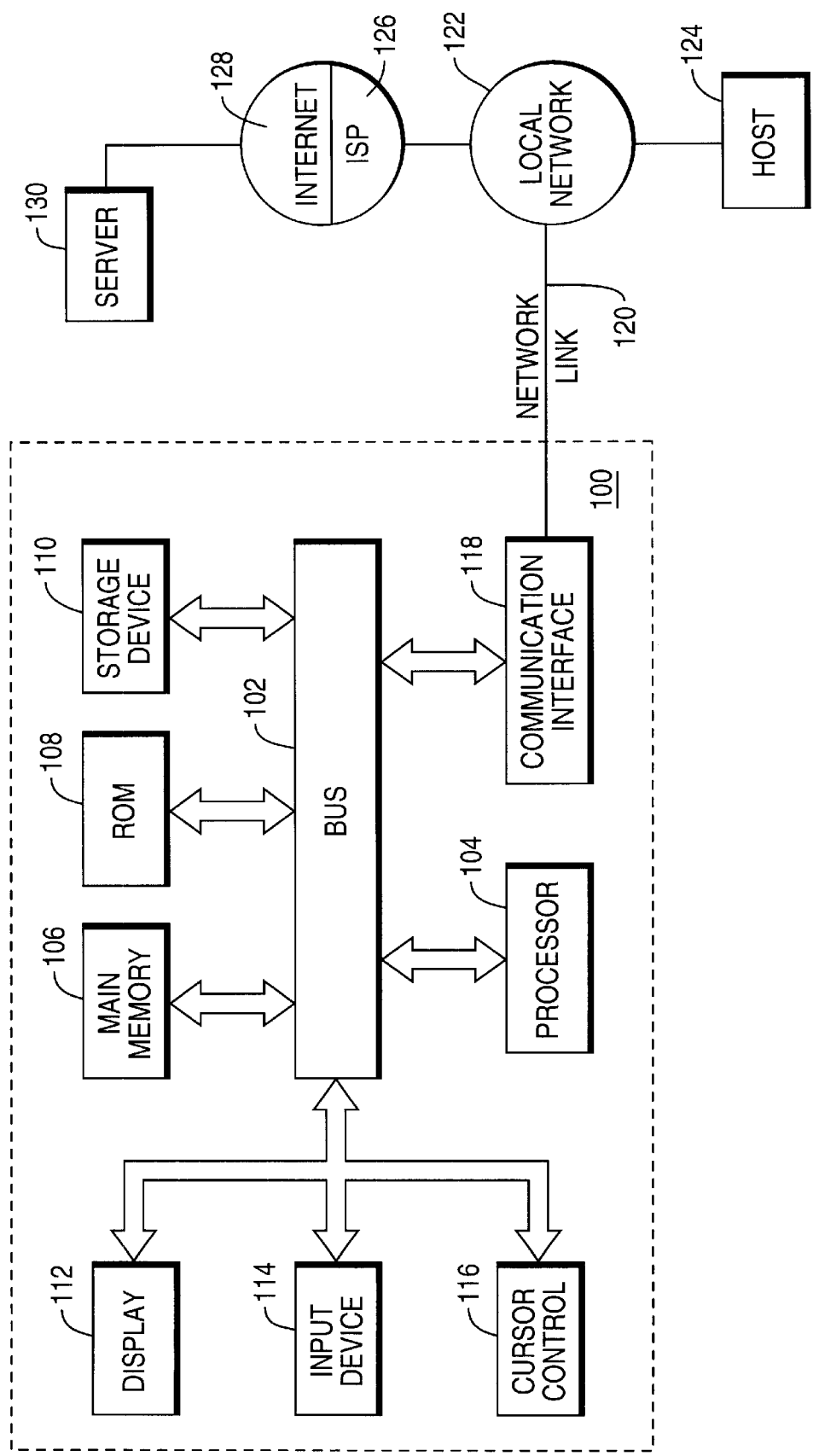
FIG. 1 is a high level block diagram of a computer system.

FIG. 1 is a block diagram illustrating an exemplary computer system 100 upon which an embodiment of the invention may be implemented. The present invention is usable with currently available terminals, personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing instructions to be executed by processor 104. Main memory 106 also may be used for storing temporary variables or other intermediate information during execution of instructions executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for information, and instructions.

Computer system 100 may be coupled via the bus 102 to a display 112, such as a cathode ray tube (CRT) or a flat panel display, for displaying information to users. An input device 114, including alphanumeric and function keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of computer system 100, such as the illustrated system of FIG. 1, to simulate the presence and use of persistent memory to hand-held platform software. According to one embodiment of the invention, the contents of a hand-held platform persistent memory is stored in computer system 100 in storage device 110. A utility creates an empty memory image disk file in storage device 110 and transfers control to the program loader. The program loader copies the contents of the main memory 106 onto the memory image disk file and returns control to the hand-held platform operating system. The file conversion utility converts the memory image disk file to a format loadable by the program loader. The flow of power to computer system 100 is stopped causing the loss of the contents of main memory 106. The reapplication of power to computer system 100 causes the program loader to reload the converted memory image disk file into main memory 106 and restart the hand-held platform operating system. Such instructions may be read into main memory 106 from another computer-readable medium, such as storage device 110.

However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides two-way data communication as is known. For example, communication interface 118 may be an integrated services digital network (ISDN) card, a digital subscriber line (DSL) card, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. Of particular note, the communications through interface 118 permit transmission or receipt of information necessary to load the hand-held platform software and specify computer system unique parameters. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave. Further, as described in detail below, specific information, i.e., computer system-specific, or more particularly terminal-specific, unique parameters, is obtained from another computer, e.g., host 124 or server 130, via communication interface 118.

In contrast to computer system 100 described above, a hand-held platform may include fewer components than the computer system 100 of FIG. 1. Specifically, the display 112, input device 114, and the cursor control 116 are often integrated into a single unit, typically a touch sensitive display, and include writing recognition instructions in either main memory or ROM for receiving input and/or cursor control. Additionally, storage device 110 is not usually a part of the hand-held platform because main memory 106 is a type of persistent memory. Thus, software and information are stored in main memory 106 instead of storage device 110. The hand-held platform includes main memory 106, i.e., persistent memory, ROM 108, bus 102, processor 104, and communication interface 118 as shown in conjunction with the computer system 100 of FIG. 1.

Prior to installation and use on the above-described hand-held platform, the hand-held platform operating system is built using compilers, assemblers, and linkers on a computer system. The typical hand-held platform operating system build process produces a file to be loaded into read only memory (ROM) in the hand-held platform.

Figure 2:
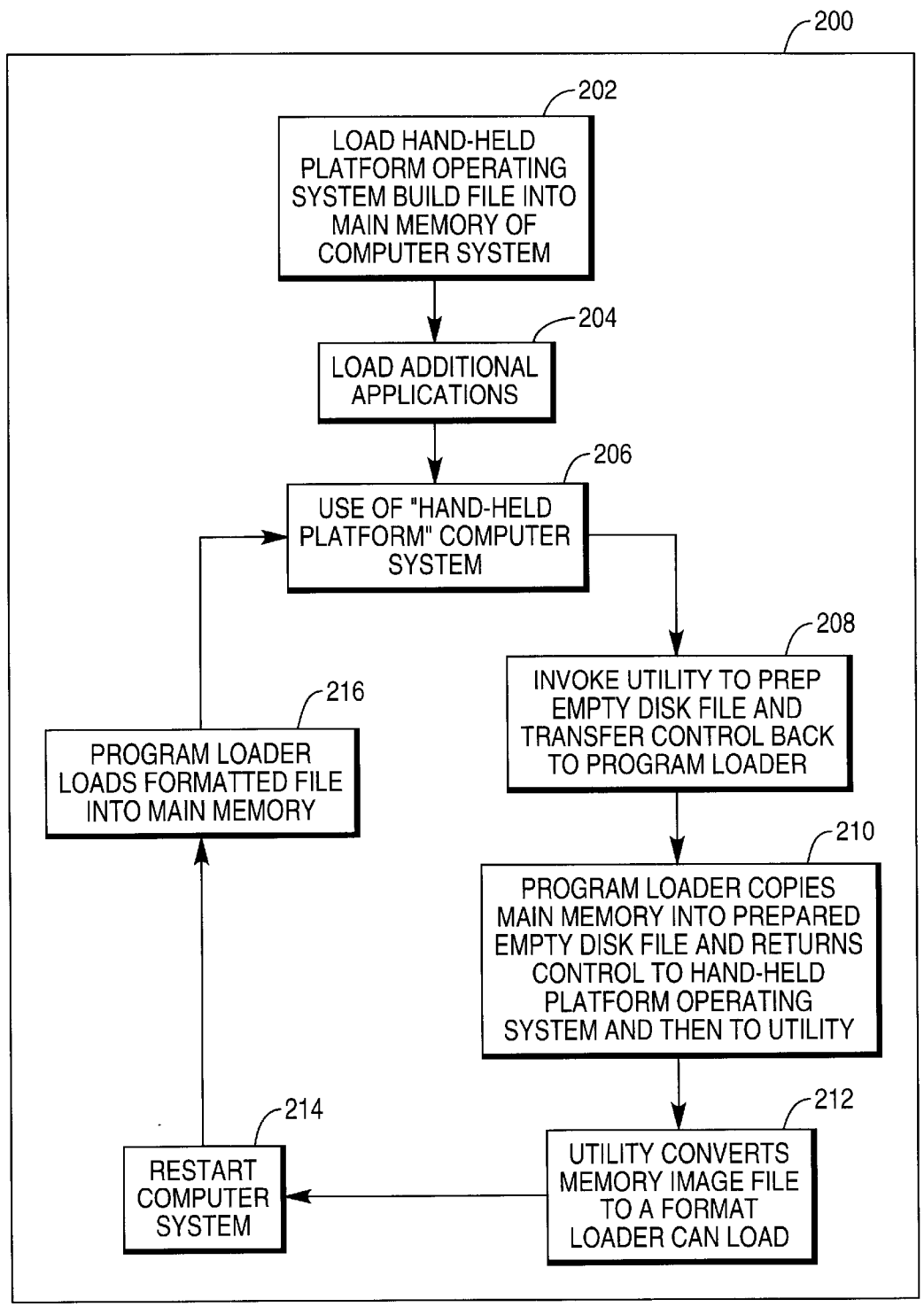
FIG. 2 is a high level flow chart of the present invention.

In the instant case and with reference to the flow chart 200 of FIG. 2, instead of loading the file into the ROM of the hand-held platform, the program loader of the present invention in step 202 loads the hand-held platform operating system build file into the RAM or main memory 106 of a computer system, i.e., a typical PC or terminal. In step 204, any additional applications are loaded into main memory of the computer system. An end-user then manipulates the PC or terminal in step 206 as if it were a hand-held platform including loading additional desired applications and information into the computer system 100.

Figure 3:
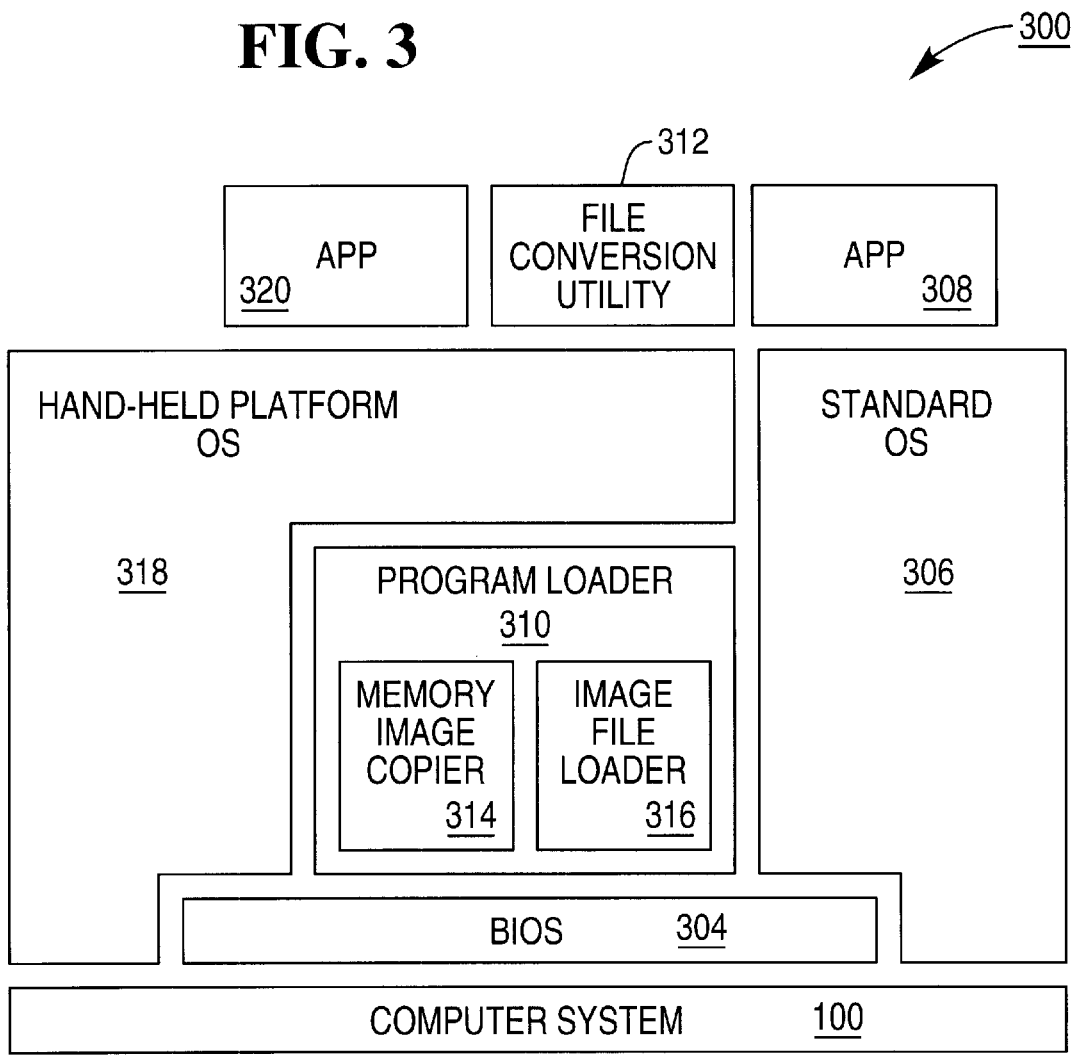
FIG. 3 is a high level block diagram of the logical architecture of the present invention.

FIG. 3 is a high level block diagram of the logical architecture of an embodiment of the present invention. The logical architecture, generally indicated by reference numeral 300, is a representation of the relationship of the system components. A computer system 100 is representative of computer system 100 (FIG. 1) and forms the base of the logical architecture. A binary input output system (BIOS) 304 provides a low-level interface between software at higher levels and computer system 100. A standard operating system (OS) 306, e.g. Windows NT, accesses computer system 100 at startup time through calls to the BIOS 304. The standard OS 306 is used when the computer system 100 is a server. Applications 308, e.g., database applications, execute on top of standard OS 306.

A program loader 310 accesses computer system 100 through calls to the BIOS 304. Program loader 310 includes memory image copier 314 and image file loader 316, each of which is more fully described below. A hand-held platform OS 318, e.g., Windows CE, accesses computer system 100 at startup time through calls to BIOS 304 and program loader 310. File conversion utility 312 and application software 320, e.g., employment kiosk applications, execute on top of hand-held platform OS 318.

Subsequent to loading and configuring applications and information on the "hand-held platform" computer system, the end-user in step 208 executes a utility (not shown in FIG. 3) creating a memory image disk file on storage device 110.

Once the memory image disk file is created, the utility transfers control to the program loader 310. In step 210, the program loader 310, using the memory image copier 314, copies the contents of the computer system main memory onto the created memory image disk file and returns the flow of control to the hand-held platform operating system 318 and then to the file conversion utility 312 in step 212. The file conversion utility 312 then converts the memory image disk file on storage device 110 to a format usable by the program loader 310 for loading onto a hand-held platform.

Turning off the computer system 100, or restarting the computer system 100 in step 214, causes the loss of main memory 106 contents in the computer system 100, but does not affect the memory image disk file stored in storage device 110. Reapplying power to the computer system 100, causes execution of the program loader in step 216. The program loader reloads the converted memory image disk file into the main memory of the computer system 100 and transfers control to the hand-held platform operating system 318 as if the main memory 106 of the computer system had been maintained by battery back-up. Thus, the previously-loaded and configured software and information are retained, and the computer system main memory functions as persistent memory on a hand-held platform. The flow of control returns to step 206 where the end-user manipulates the "hand-held platform" computer system 100.

It is to be understood that the present invention can be used in conjunction with terminal type computers, e.g., NCR 7401 or NCR 7454, personal computers, servers, mainframes, mini-mainframes and other computer systems.

In brief, the hand-held platform operating system includes a function to be used to invoke a system reboot or restart. The present invention extends the system reboot function by adding an additional write memory function, i.e., program loader 310. The write memory function copies of the contents of main memory 106, e.g., memory at addresses above 0x100000, to a memory image disk file located on storage device 110. The computer system BIOS 304 records the reason the system was restarted in a shut-down reason memory address. The present invention provides a mechanism for hand-held platform software to invoke the write memory function, i.e., program loader 310, through a memory structure called bootArgs.

Persistent memory image support is described in detail below.

The OAL module OEMIOCTL provides a standard function, "IOCTL_HAL_REBOOT", and a specific extension to this function works in conjunction with the program loader to allow an application to write all of main memory to a disk file, then "warm restart" the hand-held platform operating system. The extension is selected by setting the input buffer length to four and placing the value "WRITE_MEMORY_IMAGE_REBOOT" in the buffer.

The IOCTL function stores the dwRestartAddress pointer in a BIOS data area "reentry pointer field", e.g. segment 40:offset 67. The CMOS "shut down reason" location is set to "JMP Dword Ptr" or (0x0A) and the keyboard controller is used to cause a system reset. The system reset forces the processor of the hand-held platform, i.e., processor of the computer system, to perform a reset, the BIOS receives control and performs minimal initialization and transfers control to the "reentry pointer". Since the OAL set the reentry pointer to the restart address within the program loader, the program loader receives control and transfers control back to the hand-held platform operating system startup location.

The program loader provides a field, e.g. dwRestartAddress, in the bootArgs structure that contains a segment:offset entry point within the program loader. The program loader provides a field, e.g. dwRestartRequest, in the bootArgs structure, that contains an entry that specifies a restart option to be selected upon restart. When control is passed to the dwRestartAddress entry point in "X86 real mode", the program loader examines the dwRestartRequest field and if the option is set to a specific value, e.g., WRITE_MEMORY_IMAGE_REBOOT, the program loader attempts to write all of main memory to the storage device or hard disk. Then, the program loader transfers control back to the hand-held platform operating system at the original operating system entry point in the same manner that the transfer took place during initial program load.

Apart from writing to the storage device or hard disk, the operation of the program loader is identical to the operation of the program loader during operating system restart and as described in detail above. The remainder of this section applies to the memory image function.

During an WRITE_MEMORY_IMAGE_REBOOT operation, the program loader uses the extended BIOS's large block address disk access functions to locate the root directory of the bootable FAT12 or FAT16 partition on the first storage device or hard disk. If a file with a specified name, e.g. CEMEM.IMG, is present in the root directory, and if the file is large enough to contain all of main memory, then the program loader copies the current contents of main memory to that file. Thus, offset zero (0) within the file contains an image of the memory at address 0x100000, and is followed by the remainder of main memory.

After the program loader completes the write operation, it places the result into the bootArgs structure so that it can be retrieved by the hand-held platform operating system and application software.

The present invention provides many distinct advantages and benefits including the ability to simulate memory persistence in a computer system not having persistent memory.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A computer implemented method of providing persistent memory to a hand-held platform operating system on a computer system having volatile memory, and a storage device including a first load format image file comprising the hand-held platform software and information, comprising the steps of:

loading the first load format image file from the storage device into the volatile memory;

copying the contents of the volatile memory onto a memory image disk file;

converting the memory image disk file into a second load format image file;

storing the second load format image file onto the storage device;

restarting the computer system; and loading the second load format image file from the storage device into the volatile memory.

2. The method as claimed in claim 1, wherein the loading step reads directly from the storage device and the storing step writes directly to the storage device.

3. The method as claimed in claim 1, wherein the loading step writes directly to the volatile memory and the storing step reads directly from the volatile memory.

4. A computer implemented system for providing persistent memory to a hand-held platform operating system on a computer system, comprising:

a processor for receiving and transmitting data;

a volatile memory for storing sequences of instructions and information coupled to the processor; and a storage device coupled to the processor, the storage device having stored therein a first load format image file comprising a) hand-held platform software and information and b) sequences of instructions which, when executed by the processor, cause the processor to:

load the first load format image file from the storage device into the volatile memory;

copy the contents of the volatile memory onto a memory image disk file;

convert the memory image disk file into a second load format image file;

store the load format image file onto the storage device;

restart the computer system; and load the second load format image file from the storage device into the volatile memory.

5. The system as claimed in claim 4, wherein the load instructions read directly from the storage device and the store instructions write directly to the storage device.

6. The system as claimed in claim 4, wherein the load instructions write directly to the volatile memory and the store instructions read directly from the volatile memory.

7. The method of claim 1 further comprising, after the step of loading the first load format image file, the step of:

executing the hand-held platform operating system on the computer system.

8. The method of claim 1 further comprising, after the step of loading the first load format image file, the step of:

invoking a system reboot or restart function utilizing the hand-held platform operating system.

9. The method of claim 1 further comprising, after the step of loading the second load format image file, the step of:

transferring control of the computer system to the hand-held platform operating system.

10. The method of claim 1 wherein the second load format image file comprises hand-held platform software and information as of the time before the computer system is restarted.

11. The system of claim 4 wherein the processor executes the hand-held platform operating system on the computer system.

12. The system of claim 4 wherein the processor invokes a system reboot or restart function utilizing the hand-held platform operating system after loading the first load format image file.

13. The system of claim 4 wherein the processor transfers control of the computer system to the hand-held platform operating system after loading the second load format image file.

14. The system of claim 4 wherein the second load format image file comprises hand-held platform software and information as of the time before the computer system is restarted.

15. A method of operating an operating system requiring nonvolatile memory on a computer system including volatile memory and a storage device, the method comprising:

executing the operating system requiring nonvolatile on the computer system utilizing the volatile memory;

copying the contents of the volatile memory into a memory image disk file;

converting the memory image disk file into a load format image file;

storing the load format image file onto the storage device;

restarting the computer system;

loading the load format image file from the storage device into the volatile memory; and executing the operating system on the computer system utilizing the load format image file stored in the volatile memory.

16. The method of claim 15 wherein the step of restarting the computer system causes the loss of the contents of the volatile memory.

17. The method of claim 15 wherein the load format image file comprises operating system information as of the time before the computer system is restarted.

\* \* \* \* \*